United States Patent [19]

Pedersen et al.

[11] Patent Number: 5,923,842
[45] Date of Patent: Jul. 13, 1999

[54] METHOD AND APPARATUS FOR SIMULTANEOUSLY PROVIDING ANONYMOUS USER LOGIN FOR MULTIPLE USERS

[75] Inventors: Bradley J. Pedersen, Parkland; Marc A. Bloomfield, Pompano Beach, both of Fla.

[73] Assignee: Citrix Systems, Inc., Fort Lauderdale, Fla.

[21] Appl. No.: 08/813,821

[22] Filed: Mar. 6, 1997

[51] Int. Cl.⁶ .................................................. G06F 11/00
[52] U.S. Cl. ............................. 395/188.01; 395/187.01
[58] Field of Search ..................... 395/188.01, 187.01, 395/186; 707/9; 380/3, 4, 23, 25; 340/825.3; 364/479.07; 705/18, 44

[56] References Cited

U.S. PATENT DOCUMENTS

| | | | |
|---|---|---|---|
| 4,924,378 | 5/1990 | Hershey et al. | 395/187.01 |
| 5,204,897 | 4/1993 | Wyman | 380/4 |
| 5,297,283 | 3/1994 | Kelly, Jr. et al. | 395/650 |
| 5,347,578 | 9/1994 | Duxbury | 380/4 |
| 5,390,297 | 2/1995 | Barber et al. | 395/186 |
| 5,455,953 | 10/1995 | Russell | 395/739 |
| 5,509,070 | 4/1996 | Schull | 380/4 |
| 5,524,238 | 6/1996 | Miller et al. | 395/600 |
| 5,544,246 | 8/1996 | Mandelbaum et al. | 380/23 |
| 5,553,139 | 9/1996 | Ross et al. | 380/4 |
| 5,557,732 | 9/1996 | Thompson | 395/61 |
| 5,564,016 | 10/1996 | Korenshtein | 395/186 |
| 5,592,549 | 1/1997 | Nagel et al. | 380/4 |
| 5,604,490 | 2/1997 | Blakley, III et al. | 395/187.01 |
| 5,638,513 | 6/1997 | Ananda | 395/188.01 |
| 5,708,709 | 1/1998 | Rose | 380/4 |
| 5,737,416 | 4/1998 | Cooper et al. | 380/4 |
| 5,742,757 | 4/1998 | Hamadani et al. | 395/186 |

FOREIGN PATENT DOCUMENTS

| | | | |
|---|---|---|---|
| 0679980 | 2/1995 | European Pat. Off. | G06F 1/00 |
| 2168831 | 6/1986 | United Kingdom | H04L 11/26 |

OTHER PUBLICATIONS

Maxemchuk et al. "The Use of Communications Networks to Increase Personal Privacy", IEEE INFOCOM, pp. 504–512, 1995.

Frankilin et al., "The Design and Implementation of a Secure Auction Service", IEEE Trans. on Software Engineering, pp. 2–14, 1995.

*Primary Examiner*—Joseph E. Palys
*Attorney, Agent, or Firm*—Testa, Hurwitz & Thibeault, LLP

[57] ABSTRACT

A method for allowing anonymous user login to a computer begins when an application request is received from a client. The next available anonymous user name is determined and assigned to the client's application request. The anonymous user name is authenticated and a new session is created, which invokes the application targeted by the client's application request. When the client terminates execution of the application, the anonymous user name is returned to the anonymous user name pool and is available to be reassigned to the next anonymous user.

26 Claims, 1 Drawing Sheet

METHOD AND APPARATUS FOR SIMULTANEOUSLY PROVIDING ANONYMOUS USER LOGIN FOR MULTIPLE USERS

FIELD OF THE INVENTION

The present invention relates to providing login capability in a computer system and, more specifically, to providing guest user login access to multiple clients.

BACKGROUND OF THE INVENTION

In many situations, it is desirable to allow clients to login to a computer system on which they have no account, i.e. login "anonymously," in order to achieve a desired objective. For example, a client downloading a file from a remote computer over the Internet will often anonymously login as "guest." The anonymous "guest" account allows the client to access a file and download it, even though the client does not have an account on the target computer system, but generally gives the client very little additional permissions. For example, a client logged in as "guest" usually cannot to add files to the systems, edit files present on the system, affect the execution of programs on the system or, in many cases, begin execution of an application.

It can be useful, however, to allow a client to anonymously login to a computer in order to execute an application. For example, a software company could allow clients to anonymously login to a computer in order to run a demo version of an application so that the users can evaluate the suitability of the application. Other uses include remote access to servers in which the server hosts an application required by the remote client.

Some operating systems do not provide "guest" account access at all, which restricts users of the system to those users having an account. Other operating systems provide for multiple "guest" accounts, but all the "guest" users share the same execution environment. Shared execution environments prohibit simultaneous execution of all but the most rudimentary programs. Because most programs set up scratch directories, data directories, and home directories, each guest user needs a separate work environment including at least a home directory, a temporary directory, a data directory, and a security context. Current operating systems do not provide "guests" with separate execution environments.

SUMMARY OF THE INVENTION

The present invention allows multiple clients to be anonymously logged into a computer system simultaneously. Since each "guest" is given a unique user name, multiple guests can simultaneously execute applications.

In one aspect, the present invention relates to method for providing simultaneously anonymous user login to multiple clients. The method begins by receiving an application request from a client node. A unique user name is selected from a number of temporary names which are available. In some embodiments a password can be associated with the unique user name. In one embodiment the names are stored in a linked list. In another embodiment the names are stored in a multi-string. The chosen unique user name is associated with the client's application request and is authenticated by the system.

In another aspect, the present invention relates to an apparatus for providing simultaneous anonymous user login. The apparatus includes a temporary name pool stored in a memory element and an assigning means for assigning a temporary name to a client node. In a further embodiment the apparatus includes means for receiving an application request. In another embodiment the apparatus includes a means for selecting a temporary name from the temporary name pool.

In yet another aspect the present invention relates to an article of manufacture having computer-readable program means embodied thereon. The article of manufacture includes computer-readable program means for selecting a unique user name from a plurality of temporary user names and computer-readable program means for associating the unique user name with a client node. In further embodiments, the article of manufacture includes computer-readable program means for authenticating the unique user name. In another embodiment the article of manufacture includes computer-readable program means for receiving an application request from a client node.

BRIEF DESCRIPTION OF THE DRAWINGS

This invention is pointed out with particularity in the appended claims. The above and further advantages of this invention may be better understood by referring to the following description taken in conjunction with the accompanying drawings in which:

DETAILED DESCRIPTION OF THE INVENTION

Figure 1:
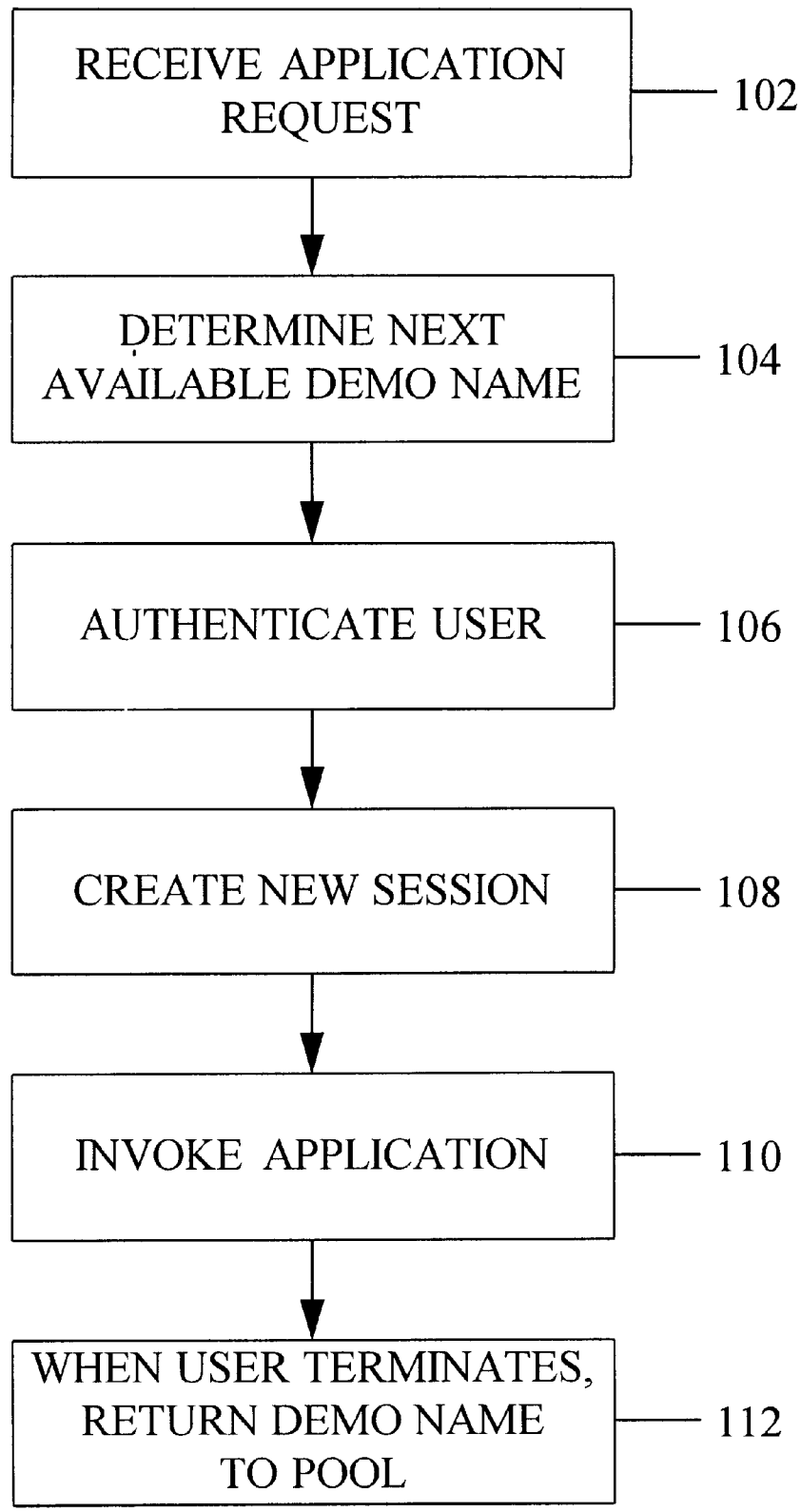
FIG. 1 is a flowchart of the steps to be taken in simultaneously providing multiple users with anonymous login.

Referring now to FIG. 1, a computer hosting one or more applications receives an application request from a client node (step 102). The application request itself may be received locally, i.e. the user may be physically proximate to the computer and enter an application request via a traditional input device such as a keyboard or mouse, or the application request may be received over a serial connection, a modem, or a network. The network may be a local area network, a wide area network, or a global computer network, such as the Internet. The application request may take many forms and for the purposes of this specification, should be understood to include login requests, requests for the system to perform operating system functions, as well requests to begin execution of application programs.

When the client node's application request is received, the system determines whether the application requires a specific privilege level to allow execution. This information may be determined by looking it up in a database, a system-wide table, or a file containing system information. If the application requires a specific privilege level to allow execution, the client node is presented with a login screen which requires the user to enter information in order to help the computer verify the identity of the user. Information such as name, password, location, or any other information which helps identify the user may be requested.

If the application identified by the application request does not require a specific privilege level in order to allow execution, then an anonymous session for the user can be created to fulfill the client's request. The system consults an anonymous user name pool in order to determine the next available anonymous login (step 102).

The anonymous user name pool may be any data construct which facilitates the creation, deletion, and ordering of anonymous user names, such as an array, a multi-string, or a linked list. The anonymous user name pool may include an entry which indicates the next available anonymous user name, such as in the case of an array, or alternatively the anonymous user name pool may simply present the next available account or process name to the requester, such as the head of a linked list. The anonymous user name pool may also include passwords associated with each of the anonymous user names in the pool.

Once the next available anonymous name has been determined, the requester associates that name with the application request and submits it for authentication. The association of an anonymous user name with an application request may require an "in-use" entry to be made or, in the case of a dynamically-linked list, the anonymous user name, together with any associated information, may be removed from the list while the name is in use by the application request.

Whatever method is used to associate the anonymous user name with the application request, the application request, together with the associated anonymous user name, is submitted to the system for authentication (step 106). The system verifies that the anonymous user name has the proper privileges to execute the application request.

To authenticate that the anonymous user name has the proper privilege level, the system looks up the anonymous user name in a database. If the user name does not exist, the client's application request is not authenticated and the login fails. If the anonymous user name exists, the password given with the user name for authentication is compared to the password expected, i.e. the password stored in the database. If the password does not match, the client's application request is not validated and the login fails. Authentication, and therefore login, succeeds only if both the anonymous user name and the password match.

Once the user has been authenticated, a new session is created for that application request (step 108). Creating a new session requires initialization of an execution environment for the application request. For example, in a common operating system environment, such as WINDOWS NT™, creating a new session for the user requires that: (1) security context for the application request is initialized; (2) a user profile, which contains the user name's default settings, is loaded; (3) connections are made to default file and print servers; (4) default disk drive mapping and printer connections are initialized; (5) the execution environment for the requested application is loaded; and (6) the application is invoked. The execution environment created for the application request allows the application request to execute the target application and results are returned to the requesting client node.

When the client terminates the application, the anonymous user name, together with any associated information such as a password, is returned to the anonymous user name pool (step 112). Concurrent with returning the anonymous user name to the anonymous user name pool, the user space/environment set up for that anonymous user name is removed, and any memory space allocated for that environment is returned to free memory.

The method and apparatus of the present invention may be provided as an article of manufacture having computer-readable program means embodied thereon. The article can be any form of computer-readable media, including hardware, e.g. RAM chip, ROM chip, or PROM chip, as well as traditional form of software distribution, e.g. floppy disk, hard disk, optical disk, magneto-optical disk, or CD-ROM. The computer-readable program means embodied thereon are any form of program means that provide the functions described above, whether as a single monolithic program or as functional modules. The program means may be provided as object code or they may be provided as source code written in C, C++, PASCAL, LISP, FORTRAN or some other suitable programming language.

Having described certain embodiments, it will now become apparent to one of ordinary skill in the art that other embodiments incorporating the concepts of the invention may be used. Therefore, the invention should not be limited to certain embodiments, but rather should be limited only by the spirit and scope of the following claims.

What is claimed is:

1. A method for providing simultaneous anonymous user login to multiple users of a computer system, each user associated with at least one client node the method comprising the steps of:

(a) receiving an application request from a client node;

(b) selecting a unique user name from a plurality of temporary user names;

(c) associating said unique user name with the application request; and (d) authenticating the unique user name associated with the application request without knowledge of the identity of the client node making the application request.

2. The method of claim 1 wherein step (b) further comprises:

(b) selecting a unique user name from a linked list of temporary user names.

3. The method of claim 1 wherein step (b) further comprises:

(b) selecting a unique user name from a multi-string of temporary user names.

4. The method of claim 1 wherein step (b) further comprises selecting a unique user name from a plurality of temporary user names, wherein a password is associated with the unique user name selected.

5. The method of claim 1 further comprising the steps of:

(e) creating a new session for the client node; and (f) invoking an application in response to the application request.

6. The method of claim 5 further comprising the steps of:

(g) receiving a termination signal from the client node; and (h) disassociating said unique user name from the application request.

7. The method of claim 1, further comprising the step of (e) removing the temporary user name from the list while the name is in use by the application request.

8. The method of claim 6 further comprising the step of (c) returning the user name to the list of temporary user names.

9. An apparatus for providing simultaneous anonymous user login to multiple users of a computer system, each user associated with at least one client node, the apparatus comprising:

a plurality of temporary user names stored in a memory element, and assigning means for assigning at least one of said plurality of temporary user names to an application request made by a client node; and authenticating means for authenticating the user name assigned to the application request without knowledge of the identity of the client node making the application request.

10. The apparatus of claim 9 further comprising means for receiving an application request from a client node.

11. The apparatus of claim 9 further comprising means for selecting a temporary user name from said plurality of temporary user names.

12. The apparatus of claim 9 wherein said plurality of temporary user names comprises a linked list.

13. The apparatus of claim 9 wherein said linked list is circular.

14. The apparatus of claim 9 wherein said plurality of temporary user names comprises a multi-string.

15. An article of manufacture having computer-readable program means embodied thereon for providing simultaneous anonymous user login to multiple users of a computer system, each user associated with at least one client node, the article comprising:

computer-readable program means for selecting a unique user name from a plurality of temporary user names without knowledge of the identity of the user associated with the client node making the application request; and computer-readable program means for associating said unique user name with an application request made by a client; and computer-readable program means for authenticating the user name associated with the application request without knowledge of the identity of the client node making the application request.

16. The article of manufacture of claim 15 further comprising computer-readable program means for receiving an application request from a client node.

17. The article of manufacture of claim 15 further comprising:

computer-readable program means for creating a new session for the client node; and computer-readable program means for invoking an application in response to the received application request.

18. The article of manufacture of claim 15 further comprising:

computer-readable code means for receiving a termination signal from the client node; and computer-readable code means for disassociating said unique user name from the application request.

19. A method for providing simultaneous anonymous user login to multiple users of a computer system, each user associated with at least one client node, the method comprising the steps of:

(a) receiving an application request from a client node;

(b) selecting a unique user name from a plurality of temporary user names;

(c) associating said unique user name with the application request;

(d) authenticating the unique user name associated with the application request without knowledge of the identity of the client node making the application request; and (e) initializing an execution environment for the application request.

20. The method of claim 19, further comprising the step of (f) returning output of the application request to the client node.

21. The method of claim 19, wherein step (e) comprises initializing a security context for the application request.

22. The method of claim 19 wherein step (e) comprises loading a user profile comprising default settings associated with the user name.

23. The method of claim 19 wherein step (e) comprises connecting to default file and print servers.

24. The method of claim 19 wherein step (e) comprises initializing default disk drive mapping and printer connections.

25. The method of claim 19 wherein step (e) comprises loading the execution environments for the requested application.

26. The method of claim 19 wherein step (e) comprises invoking the application identified by the request.

* * * * *